United States Patent Office.

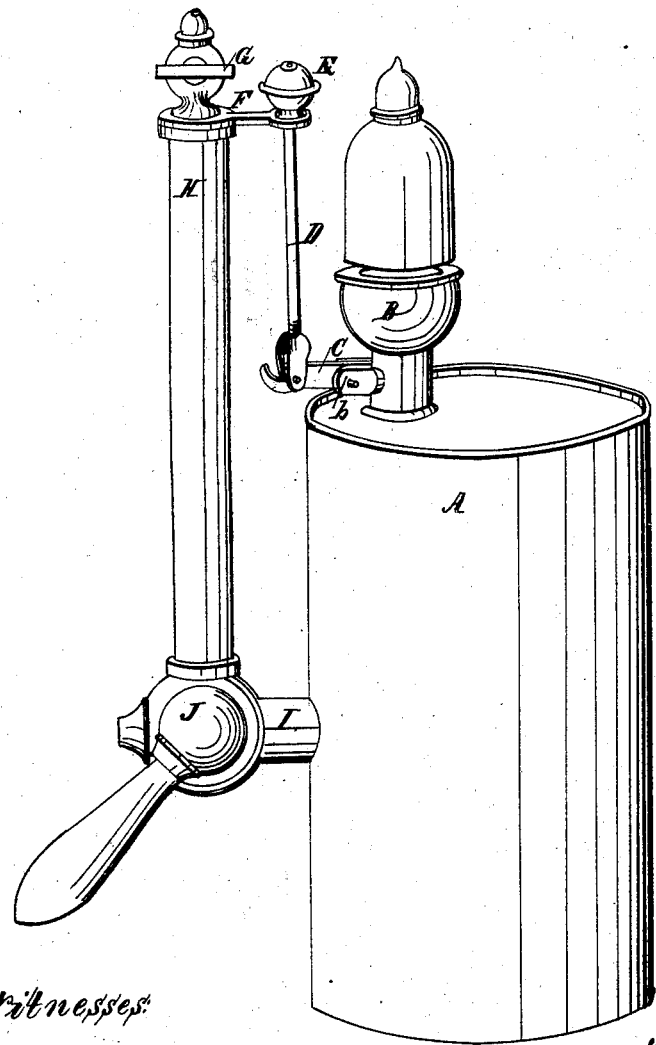

T. C. HARGRAVE AND W. B. CHARLTON, OF BOSTON, MASSACHUSETTS.

*Letters Patent No. 77,978, dated May 19, 1868.*

IMPROVEMENT IN LOW-WATER INDICATORS.

The Schedule referred to in these Letters Patent and making part of the same.

Be it known that we, T. C. HARGRAVE and W. B. CHARLTON, both of Boston, in the county of Suffolk, and State of Massachusetts, have invented a new and improved Low-Water Indicator for Steam-Boilers; of which the following is a full, clear, and exact description, reference being had to the accompanying drawings, making a part of this specification, and representing a perspective view of a steam-boiler and apparatus embodying our invention.

The object of our invention is to produce a simple and economical, and at the same time an accurate and reliable means of sounding an alarm whenever the water shall fall below a certain level in a steam-boiler; and the invention consists in connecting the valve-lever of the whistle to an arm extending from the indicating-tube by means of a weighted rod in such a manner that by the expansion of the tube, caused by the admission of steam into the same when the water falls below a certain level, the valve will be raised and an alarm be sounded.

Referring to the drawings, A represents a steam-boiler, into the top of which is inserted the whistle B, which is of the ordinary construction. To the whistle-valve is attached a lever, C, having its fulcrum in the projecting pieces b, attached to the neck of the whistle. To the outer end of the lever C is pivoted an upright rod, D, which extends through an aperture in an arm, F, and moves freely in the same. The upper end of the rod D is screw-threaded, and on the screw portion is fitted a weight, E. The arm F is securely fastened to the top of the indicator-tube H, and in the end of the said tube is fitted a cock, G. The indicator-tube is attached, at its lower end, to a pipe, I, which latter is secured in the boiler at a point below which it is desirable that the water should not fall. Between the indicator-tube H and pipe I is a cock, J.

The operation is as follows: When the water in the boiler falls to the level of the pipe I, that in the tube H will run into the boiler. The steam will then enter the indicating-tube H, and by its increased heat will cause the said tube to expand sufficiently to raise the rod D, and open the whistle-valve, when an alarm will be sounded.

The cock G, on the top of the indicator-tube, when open, allows the air to escape, for the admission of water or steam into the tube from the boiler, and also for cleaning the tube.

The weight E, on the rod D, serves to keep the whistle-valve securely closed without the aid of springs or packing, and, being fitted on the screw portion of the rod D, admits of its ready adjustment in relation to the arm F for raising the whistle-valve lever.

The whistle may be readily brought into use as an ordinary alarm or signal by simply raising the rod D or lever C, which work independently of the expansion or indicating-tube.

By placing the fulcrum of the whistle-valve lever at the end, instead of at the centre, and reversing the valve, the whistle can be made to sound when the amount of pressure is reached which it is desired to carry, and thus furnish a safety-pressure and alarm-valve, as well as a low-water indicator.

We make no claim to an expansible tube, as we are aware that such has long been in use, but

What we claim, and desire to secure by Letters Patent, is—

The arrangement of the pipe I, expansion-tube H, provided with the cock G, arm F, adjustable weighted-rod D, in connection with the lever C and whistle B, substantially as and for the purpose set forth.

In testimony whereof, we have signed our names to this specification in the presence of two subscribing witnesses.

T. C. HARGRAVE,
W. B. CHARLTON.

Witnesses:
Jos. H. ADAMS,
M. S. G. WILDE.